United States Patent [19]

Eicher et al.

[11] 3,874,390

[45] Apr. 1, 1975

[54] SMOKABLE PRODUCTS BASED ON CARBONIZED FILLER-CONTAINING CELLULOSE FILMS

[75] Inventors: Theo Eicher; Friedemann Müller; Klaus-Werner Krebs, all of Dormagen, Germany

[73] Assignee: Bayer Aktiengesellschaft, Leverkusen, Germany

[22] Filed: Feb. 8, 1973

[21] Appl. No.: 330,566

[30] Foreign Application Priority Data
Feb. 10, 1972 Germany.............................. 2206185

[52] U.S. Cl..................... 131/2, 131/143, 131/17 R, 131/262 A
[51] Int. Cl.............................................. A24b 15/00
[58] Field of Search................ 131/17, 15, 140–144, 131/2

[56] References Cited
UNITED STATES PATENTS

| | | |
|---|---|---|
| 2,809,904 | 10/1957 | Koree ..................................... 131/2 |
| 2,943,958 | 7/1960 | Schaflander et al. .................... 131/2 |
| 3,106,210 | 10/1963 | Reynolds et al. ...................... 131/17 |
| 3,385,303 | 5/1968 | Hind et al. ...................... 131/140 C |
| 3,545,448 | 12/1970 | Troon et al. ............................. 131/2 |
| 3,638,660 | 2/1972 | Davis ...................................... 131/2 |

*Primary Examiner*—Melvin D. Rein
*Attorney, Agent, or Firm*—Burgess, Dinklage & Sprung

[57] ABSTRACT

A smokable product which comprises a carbonized cellulose-based film comprising about 5 to 50% by weight of at least one inorganic filler, the cellulose of the film having a degree of degradation of about 5 to 30% by weight and a carbon-to-water molar ratio of about 1:0.8 to 1:1. The film may also contain a soluble neutral salt. It is prepared by subjecting a suitably filled cellulose film to a temperature of about 150° to 300°C for a time sufficient to degrade the cellulose the amount indicated.

10 Claims, No Drawings

SMOKABLE PRODUCTS BASED ON CARBONIZED FILLER-CONTAINING CELLULOSE FILMS

This invention relates to a smokable product which comprises a filler-containing cellulose-based film which has been subjected to a carbonizing process, and to a process for its production.

The production of cellulose-based tobacco substitutes and their use as tobacco additives are known. Smoking mixtures of this kind have been proposed with a view, for example, to reducing the amount of harmful substances present in tobacco. Cellulose derivatives, cellulose, cellulose and cellulose derivatives treated with certain salts, polygalacturonic acids or derivatives thereof, have been described as additives (U.S. Pat. No. 3,638,660).

A process for the production of a carbohydrate-based tobacco substitute is also known, in which cellulose, for example, is subjected to thermal degradation in the presence of catalysts. A strong mineral acid, salts of such acids with weak bases, alkali hydroxide or an alkali salt of a weak acid, are used as degradation catalysts in this process (British Pat. No. 1,113,979).

Products, obtained according to British Pat. No. 1,113,979, are characterized by considerable dehydration with respect to the cellulose of the material used, this means that there is an enrichment of carbon in the product of degradation in relation to hydrogen and oxygen. In these products the ratio of carbon to water is generally calculated below about 2:1. The disadvantages of such tobacco substitute are in particular the low mechanical strength. Thus, the products, which have undergone thermal degradation with extensive dehydration of the cellulose, show poor strength and form large amounts of dust in the production machines during processing, e.g., on cutting or in the formation of skeins. A further disadvantage is that the addition of binders, e.g., soluble methylcellulose or sodium carboxymethyl cellulose, which normally becomes necessary during processing, greatly impairs the taste of the products.

It is accordingly an object of the present invention to provide tobacco substitutes of satisfactory taste which have adequate mechanical strength and other physical properties to permit easy processing into end products.

These and other objects and advantages are realized in accordance with the present invention pursuant to which there is provided a smokable product comprising a carbonized cellulose-based film of which about 5 to 50% and preferably about 20 to 50% by weight comprises at least one inorganic filler. The cellulose of the film has a degree of degradation of about 5 to 30% and preferably about 15 to 25% by weight and a carbon-to-water molar ratio of about 1:0.8 to 1:1. The carbon-to-water ratio is a more simple way of expressing the ratio of carbon to hydrogen to oxygen, because the products generally have a hydrogen to oxygen ratio which corresponds to the composition of water. The calculation of the carbon-to-water ratio is based on a C,H-analysis of the product, taking into consideration the amount of water contained in the filler after the treatment according to the invention.

Fillers of the kind used in the products according to the invention are materials which are inert under smoking conditions, and also materials which give off water under smoking conditions. The following are mentioned as examples of fillers: hydroxides, oxides or oxide hydrates of aluminum and/or iron or silica, and also mixtures of these substances.

Preferred fillers include aluminum hydroxide alone or in mixture with iron hydroxide and/or silica.

Soluble neutral salts are generally present in the products according to the invention in quantities of about 1 to 20% by weight, based on the weight of the untreated filler-containing cellulose film, and preferably in quantities of about 3 to 10% by weight.

For example, sodium chloride, sodium phosphate, complex salts of ammonium, magnesium, manganese, iron or aluminum with chelate-forming carboxylic acids such as magnesium-iron citrate, manganese-iron citrate or magnesium-aluminum citrate, or the corresponding tartrates, can be used as the soluble neutral salts which, in a preferred embodiment of the invention, are present in the filler-containing cellulose film used for carbonization.

As soluble neutral salts, which in a preferred embodiment of the invention are incorporated in the filler-containing cellulose foil used for carbonization there may be used, for example, alkali metal salts of sulfur-free mineral acids, in particular the sodium and potassium salts of hydrochloric acid or phosphoric acid.

There may be mentioned for example potassium chloride, sodium chloride, primary or secondary or tertiary potassium or sodium phosphate.

As neutral salts there have proved especially advantageous the complex salts of chelate-forming carboxylic acids with trivalent iron or aluminum as complex-bound central atoms and calcium, magnesium or manganese ions as substantially ionically-bound metal ions. Preferred chelate-forming carboxylic acids and hydroxycarboxylic acids, especially oxalic acid, glyceric acid, glycolic acid, malic acid, tartaric acid, galactaric acid, saccharic acid and citric acid.

The invention also covers a process for producing the smokable product, in which a cellulose film containing one or more inorganic fillers and optionally the other specified ingredients is subjected to a temperature in the range of about 150° to 300°C. The treatment on which the process according to the invention is based is carried out in such a way that the degree of degradation of the cellulose, i.e., its loss in weight, amounts to between about 5 to 30% by weight; the initial cellulose weight is such that after degradation the inorganic filler is 5 to 50% of the weight of the filler plus degraded cellulose. The degree of degradation can readily be controlled by gravimetric analysis. Carbonization is preferably carried out at a temperature of about 220° to 280°C. The heat treatment on which the process according to the invention is based can be carried out, for example, in a heated chamber in the presence of air or even in an inert gas stream or in vacuo. The heat treatment time is governed by the required degree of degradation. At 250°C, for example, the treatment time amounts to from about 0.5 to 2 hours.

According to an embodiment of the process according to the invention, the filler-containing cellulose film may additionally contain soluble neutral salts in such quantity, that after treatment the soluble neutral salt is from about 1 to 20 % of the weight of the product.

In another preferred embodiment of the process, an oxidizing agent can additionally be added in a quantity of from about 1 to 10% by weight and preferably in a quantity of from about 2 to 5% by weight, based on the untreated filler-containing cellulose film. Potassium permanganate, manganese dioxide, ammonium vanadate or hydrogen peroxide are mentioned as examples of oxidizing agents.

Preferred oxidizing agents include potassium permanganate or hydrogen peroxide.

The products obtained by the process according to the invention can, with advantage, readily be freed from non-volatile, soluble carbonization products by washing in water, in which event soluble neutral salts should be applied after washing if they are to be present in the product. It has proved to be of particular advantage subsequently to treat the products thus obtained with aqueous or gaseous ammonia. The products according to the invention can with advantage be mixed with a combustion modifier and in addition, the flavor of the products can be improved by treating them with volatile organic solvents, for example lower alcohols, ketones, halogenated hydrocarbons or paraffins.

The smokable products according to the invention can be used as additives in cigarette tobacco; cigar tobacco or pipe tobacco. They can also be used with advantage as a cigar wrapping or as cigarette paper.

The smokable products according to the invention are distinguished from conventional smokable products by negligible smoke condensate and pleasant organoleptic properties, such as reduced smoke sharpness and neutral flavor of the smoke.

The products according to the invention show favorable mechanical processing capabilities, for example films of the kind in question can be rolled, wound or cut while moist, whereas the films thermally degraded by conventional processes disintegrate under the least mechanical stress.

For example, filter cigarettes made with the smokable products according to the invention show favorable smoldering properties and, depending upon the degree of degradation of the cellulose, give condensate quantities of about 0.5 to 3 mg per cigarette for a filling weight of about 0.7 to 1.0 g per cigarette (condensate determined in accordance with Coresta Standard No. 10). degradation example, with a degree of digradation of approximately 30% by weight, hardly any smoke is given off during smoldering in the absence of neutral salts. As a result, it is possible to achieve condensate values of about 0.5 to 2 mg per cigarette. With lower degrees of degradation, for example 20% by weight, similar condensate values are obtained, although additions of soluble neutral salts have proved to be of particular advantage here in accordance with a preferred embodiment of the process according to the invention.

The smoke given off from the carbonized, filler-containing cellulose films is largely compatible with aroma components inherent in tobacco and with artificial aroma components. The products according to the invention proved to be compatible in admixture both with synthetic substances or with substances obtained by the extraction of tobacco, which may optionally have been freed from ballast substances by treatment with ion exchangers or by dispersion between immiscible solvents, and with various types of tobacco such as Bruley, Virginia or Orient. In either case, it is possible to obtain a blended flavor which is not different from tobacco aroma.

The use of the invention may be limited by legal requirements, more particularly by food regulations. The invention is illustrated by, though not limited to, the following examples.

EXAMPLES 1 to 4:

A paper web having a surface weight of 50 g/m$^2$, a thickness of 52 $\mu$ and containing 44.6% by weight of aluminum hydroxide as filler was treated in a ventilated chamber for different periods at 240°C. The weight losses of the film and the weight losses of the aluminum hydroxide determined in comparison tests are set out in Table I.

TABLE I

| Example | Time in hours | Total weight loss of the film in % | Weight loss of the aluminum hydroxide in % by weight* |
|---|---|---|---|
| 1 | 1 | 14 | 9 |
| 2 | 2 | 25 | 14.6 |
| 3 | 3 | 30 | about 15.4 |
| 4 | 5 | 39 | about 15.4 |

*caused by loss of water

Table II shows the degrees of degradation of cellulose for the Examples and the carbon-to-water ratio as determined by analysis with allowance made for the water content of the filler.

Table II

| Example | Degree of Degradation of Cellulose | C to H$_2$O | |
|---|---|---|---|
| 1 | 5 | 6 | 6 |
| 2 | 9.4 | 6 | 5.7 |
| 3 | 14.6 | 6 | 6 |
| 4 | 23.6 | 6 | 5.2 |

The mechanical and organoleptic properties of the smokable products obtained in accordance with Examples 1 to 4 are shown in Table III.

Table III

| Ex. | Mechanical properties | Main Stream Smoke | Flavor | Sharpness | Condensate (mg) |
|---|---|---|---|---|---|
| 1 | readily cut | heavy smoke formation | reminiscent of cellulose, but less so than the starting material | slight | 3.0 |
| 2 | readily rolled and cut | reduced smoke formation | slightly reminiscent of cellulose | very slight | 2.8 |
| 3 | good after moistening, can be cut and processed | weak smoke formation | none | none | 2.1 |
| 4 | cut and processed | negligible smoke formation | none | none | 1.4 |

The quantity of condensate was determined in accordance with Coresta Standard No. 10, the test cigarettes being smoked through a Cambridge filter under the following conditions: draw volume 35 ml, draw time 2 seconds, draw frequency 60 seconds.

Under the same conditions, a standard filter cigarette of the low-nicotine type produced condensate in a quantity of 21.1 mg.

EXAMPLE 5

The same filler-containing web as in Example 1 was carbonized for about 1.75 hours at 230°C until the weight loss amounted to 20%. The degree of degradation of the cellulose of the product thus obtained amounted to 11.2% by weight, and the carbon-to-water ratio to 6:5.8. The smoke condensation produced by a filter cigarette with a filling weight of 800 mg was 2.5 mg. The mechanical and organoleptic properties are set out in Table IV.

EXAMPLE 6

The same filler-containing paper web as in Example 5 was impregnated with an aqueous solution containing 3% by weight of sodium chloride and 6% by weight of magnesium-iron citrate up to an increase in weight of 6% by weight. Carbonization was carried out for about 20 minutes at 230°C, producing a weight loss of 20%, based on the starting material. The degree of degradation of the cellulose of the product thus obtained amounted to 16.4% by weight, and the carbon-to-water ratio 6:5.6. A filter cigarette with a filling weight of 800 mg produced smoke condensate in a quantity of 2.4 mg. The mechanical and organoleptic properties are set out in Table IV.

EXAMPLE 7

The same filler-containing paper web as in Example 5 was impregnated with an aqueous potassium permanganate solution and dried in such a way that the increase in weight amounted to 2%. It was then impregnated with an aqueous solution containing 3% by weight of sodium chloride and 6% by weight of magnesium-iron citrate up to an increase in weight of 6%. Carbonization of this film was carried out for about 20 minutes at 230°C, producing a weight loss of 30%, based on the starting material. The degree of degradation of the product thus obtained amounted to 25% by weight, and the carbon-to-water ratio to 6:5.2. A filter cigarette with a filling weight of 800 mg produced smoke condensate in a quantity of 0.8 mg. The mechanical and organoleptic properties are set out in Table IV.

EXAMPLE 8

A paper web having a surface weight of 35 g/m², a thickness of 40 $\mu$ and containing 30% by weight of aluminum hydroxide was impregnated with an aqueous solution of 3% by weight of sodium chloride, 3% by weight of magnesium-iron citrate and 3% by weight of manganese-iron citrate so that the increase in weight after drying amounted to 7.6%. Carbonization of this product was carried out for about 20 minutes at 240°C, producing a weight loss of 24.1%. The degree of degradation of cellulose of the product thus obtained amounted to 19.2% by weight, and the carbon-to-water ratio to 6:4.8. A filter cigarette with a filling weight of 800 mg produced smoke condensate in a quantity of 1.2 mg. The mechanical and organoleptic properties of the product are set out in Table IV.

EXAMPLE 9

A paper web having a surface weight of 32 g/m², a thickness of 38 $\mu$ and containing 22.1% by weight of aluminum hydroxide and 8% by weight of silica sol as fillers, was impregnated with an aqueous solution of 3% by weight of sodium chloride and 6% by weight of magnesium-aluminum citrate. Carbonization was carried out for about 20 minutes at 240°C, producing a weight loss of 19.8%. The degree of degradation of cellulose of the product thus obtained amounted to 14 % by weight and carbon-to-water ratio to 6:5.2. A filter cigarette with a filling weight of 800 mg produced condensate in a quantity of 2.8 mg. The mechanical and organoleptic properties are set out in Table IV.

Table IV

| Example | Mechanical properties | Main stream smoke | Flavor | Sharpness | Condensate (mg)* | Number of draws |
|---|---|---|---|---|---|---|
| 5 | readily cut when moist, becoming somewhat powdery when dry | slight smoke formation | neutral | none | 3.0 | 9 |
| 6 | " | almost no smoke formation | mild | none | 2.4 | 8.5 |
| 7 | " | no smoke formation | none | none | 0.8 | 8.6 |
| 8 | " | weak smoke formation | mild neutral | none | 1.2 | 8.2 |
| 9 | " | slight smoke formation | neutral | some sharpness | 2.8 | 8.0 |

*As determined in accordance with Coresta Standard No. 10 (cf. Example 1).

What is claimed is:

1. A smokable product which comprises a carbonized cellulose-based film which carbonized cellulose-based film contained during carbonization 5 to 50% by weight of at least one inorganic filler selected from the group consisting of a hydroxide, oxide or hydrated oxide of aluminum, iron or silicon, the cellulose of the film being carbonized by heat degradation at temperatures of 150°–300°C and having a degree of degradation of about 5 to 30% by weight and a carbon-to-water molar ratio of about 1:0.8 to 1:1.

2. A smokeable product as claimed in claim 1 in which the cellulose has a degree of degradation of about 15 to 25% by weight.

3. A smokable product as claimed in claim 2, in which the filler is present in about 20 to 50% by weight of carbonized cellulose plus inorganic filler, the product includes about 3 to 10% of at least one soluble neutral salt selected from the group consisting of sodium chloride, sodium phosphate, magnesium-iron citrate, manganese-iron citrate, magnesium-aluminum citrate, manganese-aluminum citrate, magnesium-iron tartrate, manganese-iron tartrate and manganese-aluminum tartrate.

4. A smokable product as claimed in claim 1, including about 1 to 20% by weight of at least one soluble neutral salt based on the weight of carbonized cellulose plus inorganic filler.

5. A smokable product as claimed in claim 4, in which the soluble neutral salt comprises at least one of a sodium or potassium salt of hydrochloric acid or phosphonic acid, or a complex salt of a chelate forming carboxylic acid with trivalent iron or aluminum as central atom and calcium, magnesium or manganese as cation ions.

6. A process for the production of a smokable product according to claim 1, in which a cellulose film containing at least one inorganic filler selected from the group consisting of a hydroxide, oxide or hydrated oxide of aluminum, iron or silicon, is subjected to a temperature in the range of about 150° to 300°C for a time sufficient to degrade the cellulose to the extent of about 5 to 30% by weight and to a carbon-to-water molar artio of about 1:0.8 to 1:1, the inorganic filler being present in an amount to constitute about 5 to 50% of the weight of the degraded cellulose plus inorganic filler.

7. The process of claim 6, wherein the filler-containing cellulose film contains a soluble neutral salt in an amount constituting about 1 to 20% by weight of the degraded cellulose plus filler plus soluble neutral salt.

8. The process of claim 6, wherein the filler-containing cellulose film contains 1 to 10 % by weight of an oxidizing agent.

9. The process of claim 6, wherein the filler-containing cellulose containing about 2 to 5 % of at least one oxidizing agent selected from the group consisting of potassium permanganate, maganese oxide, ammonium vanadate and hydrogen peroxide and is degraded to the extent of about 15 to 25 % by weight, and based on the weight of the degraded cellulose plus inorganic filler the inorganic filler comprises aluminum hydroxide and is present in about 20 to 50 %, at least one soluble neutral salt selected from the group consisting of sodium chloride, sodium phosphate, magnesium-iron citrate, manganese-iron citrate, magnesium-aluminum citrate, manganese-aluminum citrate. magnesium-iron tartrate, manganese-iron tartrate and manganese-aluminum tartrate is present in about 3 to 10 %.

10. A smokable product as claimed in claim 1 in which the cellulose is a paper web.

* * * * *